(12) United States Patent
Roshanzamir

(10) Patent No.: US 9,761,894 B2
(45) Date of Patent: Sep. 12, 2017

(54) POROUS INSERTS FOR IMPROVED COOLANT DISTRIBUTION IN BIPOLAR PLATE ASSEMBLIES FOR FUEL CELLS

(71) Applicants: Daimler AG, Stuttgart (DE); Ford Motor Company, Dearborn, MI (US)

(72) Inventor: Alireza Roshanzamir, Burnaby (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 391 days.

(21) Appl. No.: 14/323,095

(22) Filed: Jul. 3, 2014

(65) Prior Publication Data

US 2015/0010840 A1 Jan. 8, 2015

Related U.S. Application Data

(60) Provisional application No. 61/843,321, filed on Jul. 5, 2013.

(51) Int. Cl.
*H01M 8/04* (2016.01)
*H01M 8/24* (2016.01)
*H01M 8/04029* (2016.01)
*H01M 8/0267* (2016.01)
*H01M 8/1018* (2016.01)
*H01M 8/0232* (2016.01)
*H01M 8/0247* (2016.01)

(52) U.S. Cl.
CPC ..... *H01M 8/04029* (2013.01); *H01M 8/0267* (2013.01); *H01M 8/0232* (2013.01); *H01M 8/0247* (2013.01); *H01M 2008/1095* (2013.01)

(58) Field of Classification Search
None
See application file for complete search history.

(56) References Cited

U.S. PATENT DOCUMENTS

2003/0099873 A1* 5/2003 Brambilla ......... H01M 8/04029
 429/413
2012/0295178 A1* 11/2012 Farrington .......... H01M 8/0206
 429/437

* cited by examiner

*Primary Examiner* — Daniel Gatewood
(74) *Attorney, Agent, or Firm* — Stephan A. Pendorf; Patent Central LLC

(57) ABSTRACT

Certain fuel cell designs employ bipolar plate assemblies with internal coolant flow fields which comprise a coolant channel region and transition regions adjacent the coolant channel region. The temperature and/or pressure drop, and hence flow, of coolant over the coolant channel region can be non-uniform however, and this can have an adverse effect on cell performance. The coolant flow and temperature distribution can be modified and made more uniform by inserting an appropriate non-uniform porous insert in one or more of the coolant transition regions.

20 Claims, 2 Drawing Sheets

POROUS INSERTS FOR IMPROVED COOLANT DISTRIBUTION IN BIPOLAR PLATE ASSEMBLIES FOR FUEL CELLS

BACKGROUND

Field of the Invention

This invention relates to flow field plate modifications for fuel cells in order to improve coolant distribution. It particularly relates to modifications for bipolar plate assemblies for solid polymer electrolyte fuel cells.

Description of the Related Art

Fuel cells such as solid polymer electrolyte or proton exchange membrane fuel cells electrochemically convert reactants, namely fuel (such as hydrogen) and oxidant (such as oxygen or air), to generate electric power. Solid polymer electrolyte fuel cells generally employ a proton conducting, solid polymer membrane electrolyte between cathode and anode electrodes. A structure comprising a solid polymer membrane electrolyte sandwiched between these two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant relatively evenly throughout the cells while keeping the coolant reliably separated from the reactants.

Bipolar plate assemblies comprising an anode flow field plate and a cathode flow field plate which have been appropriately sealed and bonded together so as to form a sealed coolant flow field between the plates are thus commonly employed in the art. The plates making up such assemblies may optionally be metallic with appropriate corrosion resistant coatings and are typically produced by stamping the desired features into sheets of appropriate metal materials (e.g. certain stainless steels). Alternatively, the plates may be carbonaceous and are typically produced by molding features into plates made of appropriate moldable carbonaceous materials (e.g. polymer impregnated expanded graphite).

To provide both reactants and the coolant to and from the individual cells in the stack, a series of ports are generally provided at opposing ends of the plates for individual cells such that when the cells are stacked together they form manifolds for these fluids. Further design features that may be required then are passageways to distribute the bulk fluids to and from the various channels in the reactant and coolant flow field channels in the plates. These passageway regions are referred to as the transition regions. For instance, such regions associated with the coolant are referred to as the coolant transition regions. The various transition regions can themselves comprise numerous fluid distribution channels, e.g. fuel transition channels in a fuel transition region.

For ease of manufacture and other reasons, a common stack design employs a stack of generally rectangular, planar fuel cells whose flow field plates comprise numerous straight reactant and coolant flow field channels running from one end of the plates to the other. Further, it can be advantageous to employ a stack configuration in which certain of the ports are located on the side of the plates and thus are not in line with the flow field channels. Such a configuration however necessitates directing the associated fluid transverse to the flow field channels in order to fluidly connect the ports to the transition regions and then to the flow field channels. In designs in which transition channels appear in the transition regions, this can be accomplished by forming a duct or ducts transverse to the transition channels. As will be more apparent when discussing the Figures below, the presence of such a duct or ducts can impede the flow of other fluids in a coolant transition region. Thus, a trade-off can be required between flow through such ducts and flow through other transition channels.

Such a trade-off can be of particular concern in high power density stack designs that comprise coolant ports located on the side or sides of the plates and coolant ducts in the coolant transition region that are directed transverse to the flow fields. To achieve the highest power densities, fluid channels are often formed at the limits of reliable manufacturing capability and tolerances. Being a liquid, the coolant flow is subject to greater pressure drops than a gaseous reactant when flowing through ducts or channels of a given size. As a result, the coolant pressure drop can be particularly significant in the coolant transition regions of such high power density stacks, and especially in wider cells where longer transverse coolant ducts must be employed. Further, temperature gradients may be created across the coolant duct as the coolant traverses the coolant duct. As a consequence, the pressure and temperature of the coolant in the coolant duct may not be as uniform as desired, and thus the flow and temperature of coolant in the coolant flow field channels as it traverses the fuel cell may not be as uniform as desired. Any non-uniformity however can adversely affect cell performance in various ways. For instance, there can be an increased risk of overheating (hot spots) and over-drying in the cells on hot days. Also, it can lead to formation of wet spots in the cells, making it difficult to prepare the stack for shutdown in below freezing conditions and also difficult to recover during startup from below freezing conditions.

Despite the advances made to date, there remains a need for ever greater power density from fuel cell stacks while maintaining performance over a wide range of operating conditions. Providing greater uniformity over the active regions in the fuel cell stacks makes it possible to coax closer to the optimum performance out of the entire available area in these active regions. This invention fulfills these needs and provides further related advantages.

SUMMARY

The coolant distribution in the coolant channel regions opposing the active regions in certain fuel cell designs can be uneven in pressure and/or temperature and this can have an adverse effect on cell performance. A porous insert, which is non-uniform across its width and inserted in the inlet transition region in the internal coolant flow field of the fuel cell, can be used to modify the coolant flow and/or temperature distribution such that it is more uniform.

Specifically, the invention pertains to a bipolar plate assembly having an internal coolant flow field for a fuel cell and comprises an anode plate and a cathode plate. The anode plate comprises inlet and outlet ports for each of fuel, oxidant, and coolant fluids; a fuel flow field comprising an active region on the anode side of the anode plate in which the active region comprises a plurality of fuel channels whose inlets and outlets are fluidly connected to the inlet and outlet fuel ports respectively; and a coolant flow field comprising a coolant channel region, an inlet transition region, and an outlet transition region on the coolant side of the anode plate in which the inlet and outlet transition regions each comprise at least one transition coolant duct and the coolant channel region comprises a plurality of coolant channels whose inlets and outlets are fluidly connected to the inlet and outlet transition coolant ducts in the inlet and outlet transition regions respectively, and the inlet and outlet coolant ducts are fluidly connected to the inlet and outlet coolant ports respectively. In a like manner, the cathode plate comprises inlet and outlet ports for each of fuel, oxidant, and coolant fluids; an oxidant flow field comprising an active region on the cathode side of the cathode plate in which the active region comprises a plurality of oxidant channels whose inlets and outlets are fluidly connected to the inlet and outlet oxidant ports respectively; and a coolant flow field comprising a coolant channel region, an inlet transition region, and an outlet transition region on the coolant side of the cathode plate in which the inlet and outlet transition regions each comprise at least one transition coolant duct and the coolant channel region comprises a plurality of coolant channels whose inlets and outlets are fluidly connected to the inlet and outlet transition coolant ducts in the inlet and outlet transition regions respectively, and the inlet and outlet coolant ducts are fluidly connected to the inlet and outlet coolant ports respectively.

For reference purposes, the length direction of the plate assembly is defined by the length direction of the plurality of coolant channels and the width direction of the plate assembly is perpendicular to the length direction of the plate assembly in the plane of the plate.

Further then, the invention pertains to such bipolar plate assemblies in which the coolant side of the anode plate is bonded to the coolant side of the cathode plate to form the internal coolant flow field, and particularly to those assemblies in which the coolant ports and internal coolant flow field are configured such that coolant entering the coolant channel region from the inlet transition region would be non-uniform in flow or temperature across the width of the plate assembly. In accordance with the invention however, the plate assembly comprises a porous insert in at least one of the inlet and outlet transition regions of the internal coolant flow field. The porous insert is non-uniform across the width of the plate assembly and, when inserted, it improves the uniformity of the coolant flow or temperature.

In certain embodiments, the porous insert can be in the inlet transition coolant duct. As an alternative, the porous insert can be in the outlet transition coolant duct instead. In yet other embodiments, an additional porous insert may be used and appropriate porous inserts can be in both the inlet and outlet transition coolant ducts.

The invention is particularly relevant to plate assemblies in which the inlet coolant port is not aligned with the plurality of coolant channels in the internal coolant flow field (e.g. "side feed" embodiments). Further, it is relevant to plate assemblies in which the plurality of coolant channels are essentially parallel and straight.

To prevent coolant shorting across the inlets or outlets of the coolant channels, the porous insert can be inserted such that it contacts the ends of the plurality of coolant channels. To better prevent against such shorting, the porous insert may be actually impressed into the ends of the plurality of coolant channels, e.g. from about 1 to 3 mm into the channel ends.

The porous insert is characterized by length and width dimensions in the length and width directions of the plate assembly respectively. The porous insert can be made non-uniform then by varying a characteristic selected from the group consisting of length, permeability, porosity, and average pore size over the width of the insert. For instance, the length of the porous insert can vary over the width of the insert, and particularly can be smaller near the middle than at the ends over the width of the porous insert. In an exemplary embodiment, the length of the porous insert near the middle is about half of the lengths near the ends.

In an embodiment, the porous insert can be made of metal foam. Further, the permeability of the porous insert can be in the range from about 250 to 300 millidarcies. And further still, the average pore size of the porous insert can be less than about 200 micrometers.

The invention is suitable for use in solid polymer electrolyte fuel cells, and particularly for use in a series stack of such cells.

In a given fuel cell stack then, the coolant distribution can be improved by determining the flow, pressure drop, or temperature distribution of the coolant in the coolant channel region of the coolant flow field; preparing a porous insert non-uniformly over its width such that the flow, pressure drop, or temperature distribution of the coolant is more uniform in the coolant channel region with the porous insert inserted in at least one of the inlet and outlet transition coolant ducts; and then inserting the porous insert in one of the inlet and outlet transition coolant ducts in the internal coolant flow field of at least one plate assembly in the stack. The porous insert can be prepared to be non-uniform over its width by varying a characteristic selected from the group consisting of length, permeability, porosity, and average pore size over its width.

The invention thus includes bipolar plate assemblies and related methods for obtaining improved coolant distribution therein. These and other aspects of the invention are evident upon reference to the attached Figures and following detailed description.

BRIEF DESCRIPTION OF THE DRAWINGS

FIG. 2b shows an enlarged view of the porous insert in the inlet transition region of FIG. 2a.

DETAILED DESCRIPTION

Figure 1:
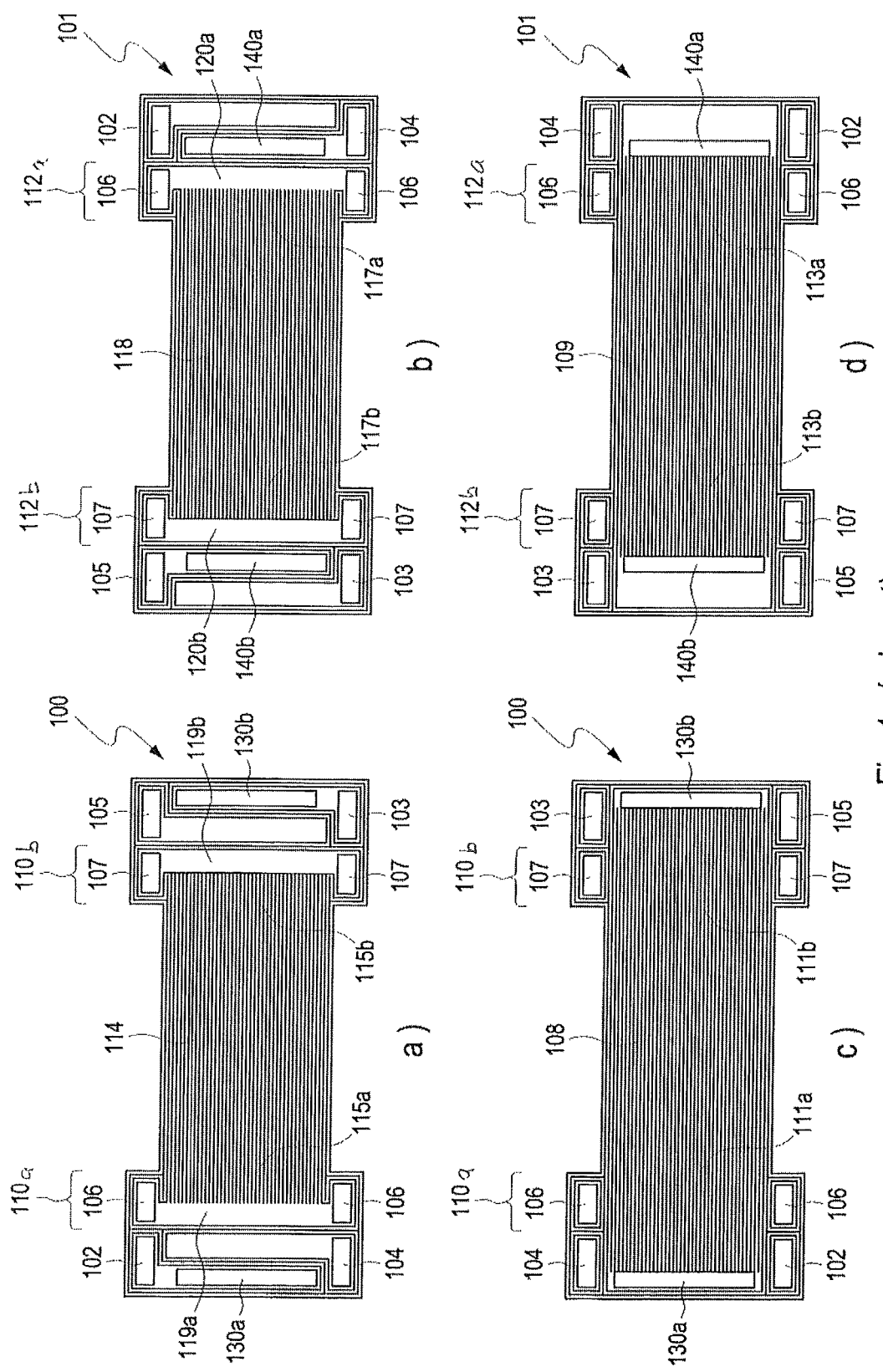
FIGS. 1a, b, c and d show schematic surface views of the coolant side of an anode flow field plate, the coolant side of a cathode flow field plate, the fuel side of the anode flow field plate, and the oxidant side of the cathode flow field plate respectively of a prior art solid polymer electrolyte fuel cell stack comprising coolant side feed ports and cross feed coolant ducts in the coolant transition regions of the flow field plates. (These Figures are reproductions of figures from US2012/0295178.)

In this specification, words such as "a" and "comprises" are to be construed in an open-ended sense and are to be considered as meaning at least one but not limited to just one.

Herein, in a quantitative context, the term "about" should be construed as being in the range up to plus 10% and down to minus 10%.

Throughout the specification, an "active region" refers to an area in the fuel cell where the electrochemical reactions take place. In the context of the fuel and oxidant flow fields, the active regions are those regions adjacent to the electrodes or to gas diffusion layers which in turn are adjacent the electrodes.

With regards to the coolant flow field, the "coolant channel region" comprises a plurality of coolant channels and is opposite the active regions on the other sides of the anode and cathode plates. The "inlet transition region" and "outlet transition region" are passageways at either end of the coolant channel region which distribute bulk coolant fluid to and from the channels in the coolant channel region. The coolant transition regions each comprise at least one substantial duct therein, namely a "transition coolant duct", but can contain other channels to assist distribution and/or other features to promote mixing, and thus further improve uniformity. There may or may not be anode or cathode electrodes, and hence active regions, on the other side of the plates opposite the inlet and outlet transition regions. Whether the transition regions are opposite to active regions or not depends on the specifics of the fuel cell design.

Herein, the length direction of the plate assembly is defined by the length direction of the plurality of coolant channels. The width direction of the plate assembly is perpendicular to the length direction of the plate assembly in the plane of the plate.

A solid polymer electrolyte fuel cell stack design suitable for automotive purposes typically comprises a series stack of generally rectangular, planar solid polymer electrolyte fuel cells. The fuel employed is usually pure hydrogen although other fuels may be considered. Air is usually provided as the oxidant. The individual fuel cells comprise a membrane electrode assembly (MEA) of a polymer membrane electrolyte and two, usually noble metal based, catalyst layers on either side of the membrane electrolyte which serve as the anode and cathode respectively. Gas diffusion layers are usually provided adjacent the catalyst layers in the MEA for several purposes, e.g. to uniformly distribute reactant gases to and by-product fluids from the electrodes, to provide electrical connection to the electrodes, and to provide mechanical support. These gas diffusion layers are engineered porous, electrically conductive structures and typically comprise carbon fibres, binder, and materials to adjust the wetting characteristics of the layers. Flow field plates are then provided adjacent the anode and cathode gas diffusion layers to distribute bulk fluids to and from the gas diffusion layers, to provide mechanical support, to provide a manifold structure for the fluids delivered to and from the cell, and also to provide a structure for circulating liquid coolant to the fuel cells. Other specialized layers or sublayers may also be provided for various purposes in the structure (for instance, between electrode and gas diffusion layer or between gas diffusion layer and flow field plate).

FIGS. 1a, b, c, and d show schematic surface views of prior art flow field plates suitable for a high power density, automotive scale solid polymer electrolyte fuel cell stack. There are two types of plates involved, one for the anode side of the cell and one for the cathode side. FIGS. 1a and 1c show views of the opposing major surfaces of anode plate 100, and FIGS. 1b and 1d show views of the opposing major surfaces of cathode plate 101. (Note: FIGS. 1a, b, c, and d have been reproduced from US2012/295178.)

Both plates have openings provided at opposite ends that serve as inlet and outlet ports for the various fluids being delivered to and from the cells. Seals are also employed around the various ports such that when a plurality of these cells are stacked together in series, the plurality of ports align and seal together so as to form manifolds for the various fluids within the stack. In FIGS. 1a, b, c, and d, the various ports shown are: fuel inlet 102, fuel outlet 103, oxidant inlet 104, oxidant outlet 105, two coolant inlets 106, and two coolant outlets 107. (For purposes of simplicity and clarity, the seal structures involved have been omitted from these Figures.)

FIGS. 1c and 1d show the major surfaces of anode plate 100 and cathode plate 101 that face the electrochemically active anode and cathode in the MEA respectively. In each of these plates, reactant flow fields have been formed comprising a plurality of generally linear flow field channels which extend from one end of the plate to the other. FIG. 1c shows numerous fuel flow field channels 108 which oppose the active area of an anode when assembled into a fuel cell. FIG. 1d shows numerous oxidant flow field channels 109 which oppose the active area of a cathode when assembled into a fuel cell. On the opposite sides of the plates, and between the reactant flow field channels and the various ports, are coolant transition regions. In these regions, various structures are provided for fluidly connecting the various ports to their appropriate flow field channels. In FIGS. 1a to 1d, the coolant inlet and outlet transition regions are denoted as 110a and 110b respectively. As shown, linear fuel flow field channels 108 extend into coolant transition regions 110a, 110b at either end of flow field plate 100. The portions of these channels extending into the transition regions are denoted as 111a, 111b respectively. (In actual cells, other distribution structures are usually also formed in coolant transition regions 110a, 110b between fuel channels 111a, 111b and fuel inlet and outlet ports 102, 103. However, for clarity, these are not shown in FIG. 1c. Note that depending on the fuel cell design, anode electrode may or may not appear adjacent fuel channels 111a, 111b in these coolant transition regions.) Fuel is provided to the associated fuel cell at fuel inlet port 102, is directed through fuel inlet backfeed port 130a to adjacent fuel channels 111a, directed through fuel field channels 108, and any remaining fuel and reaction by-products are directed from fuel channels 111b, through fuel outlet backfeed port 130b, to adjacent fuel outlet port 103.

In a like manner in FIGS. 1a to 1d, the coolant inlet and outlet transition regions in cathode plate 101 are denoted as 112a and 112b respectively. Linear oxidant flow field channels 109 extend into coolant transition regions 112a, 112b at either end of flow field plate 101. The portions of these channels extending into the transition regions are denoted as 113a, 113b respectively. Oxidant therefore is provided to the associated fuel cell at oxidant inlet port 104, is directed through oxidant inlet backfeed port 140a to adjacent oxidant channels 113a, directed through oxidant channels 109, and any remaining oxidant and reaction by-products are directed from oxidant channels 113b, through oxidant outlet backfeed port 140b to adjacent oxidant outlet port 105.

As is typically done in the art, the other sides of plates 100 and 101 are used cooperatively to create coolant flow fields for the cells in the stack. Specifically, for a given cell in the stack, the major surface of the coolant side of its anode plate 100 (shown in FIG. 1a) cooperates with the major surface of the coolant side of the cathode plate 101 (shown in FIG. 1b) of an adjacent cell in the stack to thereby create a coolant flow field. Typically, pairs of anode plates 100 and cathode plates 101 are bonded together to create bipolar plate assemblies prior to assembling the rest of the fuel cell stack.

The view in FIG. 1a of anode plate 100 is that of FIG. 1c except rotated 180 degrees about the long axis of the plate. The coolant channel region comprises linear coolant flow field channels 114 which extend into coolant transition regions 110a, 110b at either end of plate 100. These end portions of the channels are denoted as coolant transition channels 115a, 115b.

In a like manner, the view in FIG. 1b of cathode plate 101 is that of FIG. 1d except rotated 180 degrees about the long axis of the plate. The coolant channel region comprises linear coolant flow field channels 118 which extend into coolant transition regions 112a, 112b at either end of flow field plate 101. These end portions of the channels are denoted as coolant transition channels 117a, 117b.

In adjacent cells in the stack, the two surfaces shown in FIGS. 1a and 1b mate and cooperate to form a coolant flow field that is appropriately sealed from the rest of the cell and from the surrounding environment. Coolant is provided at the interface of these adjacent cells at coolant inlet ports 106 and has to be directed to adjacent coolant transition channels 115a, 117a, then directed through coolant flow field channels 114, 118, and then directed out from coolant transition channels 115b, 117b at the other end of the cells to adjacent coolant outlet ports 107.

As is evident in FIGS. 1a, b, c, and d, flow field plates 100, 101 have a side feed design for all of the fuel, the oxidant, and the coolant fluids. That is, fuel ports 102, 103, oxidant ports 104, 105 and coolant ports 106, 107 are located on the sides at the opposite ends of plates 100, 101 and are thus not in line with the linear reactant flow fields 108, 109, 114, 118. As shown, a wide path is available for fuel to be directed from fuel inlet backfeed port 130a to fuel transition channels 111a at the inlet end and directed from fuel transition channels 111b to fuel outlet backfeed port 130b at the outlet end of plate 100. However, there are no similar such wide paths available for fluidly connecting coolant ports 106, 107 to coolant transition channels 115a, 115b at each end of plate 100. Instead, transition coolant ducts 119a, 119b (in anode flow field plate 100) and 120a, 120b (in cathode flow field plate 101) are provided to make a fluid connection between coolant ports 106, 107 and coolant transition channels 115a, 115b, 117a, 117b.

Transition coolant ducts 119a, 119b, 120a and 120b are required to provide a reasonably sized path for coolant fluid to flow transverse to coolant channels 114, 118 so that coolant is reasonably well distributed to and from all these channels. However, the presence of the coolant ducts gets in the way of fuel and oxidant channels 111a, 111b, 113a, 113b and vice versa. Thus, in such embodiments, a trade-off between reactant and coolant flow capabilities is involved when sizing the various features in the flow field plates. And while the coolant flow and hence distribution throughout the transition coolant ducts in conventional flow field plates may generally be considered acceptable, pressure and temperature variations along the ducts still exist nonetheless. In turn, these variations can result in non-uniform coolant flow and/or temperatures in the channels in the coolant channel regions and may be significant enough to have an adverse effect on cell performance and/or lifetime. In the embodiments shown in FIGS. 1a-1d for instance, a small but potentially significant drop in coolant pressure may occur between the coolant ports and the centre of the coolant ducts. Further, as the coolant traverses across the width of the flow field plates, it may be heated somewhat due to the proximity to the active regions in the fuel cell stack, and thus a small but potentially significant increase in temperature may occur between the coolant ports and the centre of the coolant ducts. And as a consequence, this may lead to non-uniform flows or temperatures in the channels in the coolant channel regions and hence uneven cooling of the coolant channel regions in the fuel cell stack.

Figure 2A:
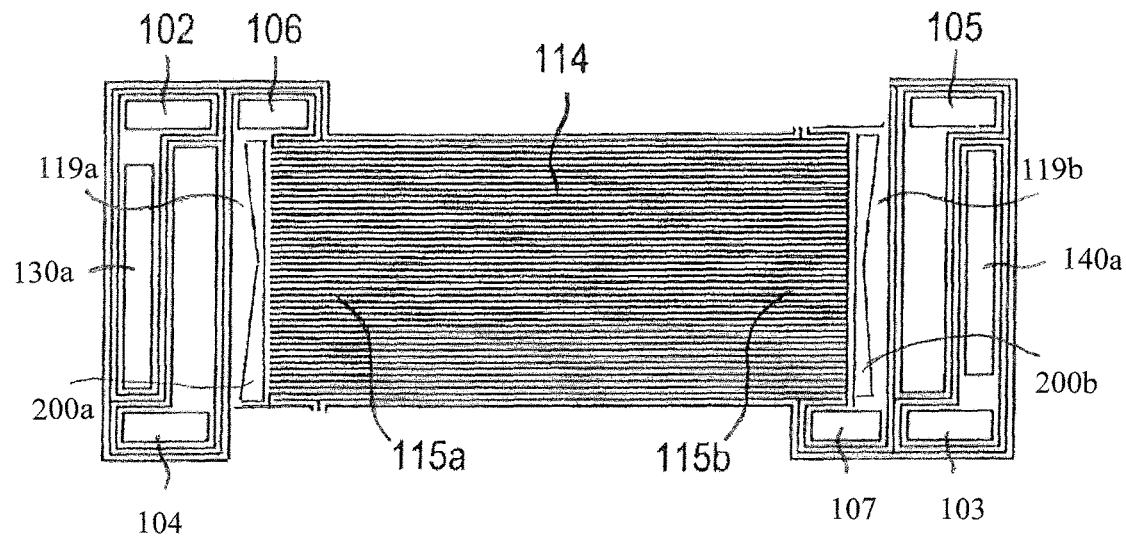
FIG. 2a shows a schematic surface view of the coolant side of an anode flow field plate with exemplary porous inserts of the invention inserted in both the inlet and outlet transition coolant ducts of the coolant flow field.
Figure 2B:
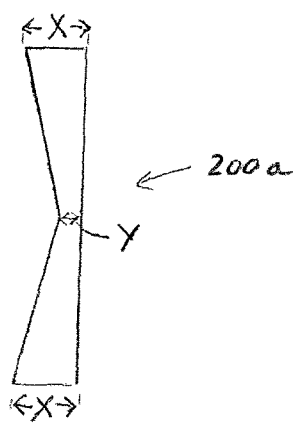

Such small but potentially significant variations in pressure and temperature across the coolant ducts can be effectively compensated for by use of an appropriate porous insert or inserts in accordance with the invention. FIG. 2a shows a schematic surface view of the coolant side of a similar embodiment of the anode flow field plate of FIG. 1a except that it has only single ports for the coolant inlet and outlet, namely inlet coolant port 106 and outlet port 107. In accordance with the invention, the anode plate of FIG. 2a includes exemplary porous inserts 200a, 200b inserted in both the inlet and outlet transition coolant ducts 119a, 119b. As shown, porous insert 200a is designed to restrict the coolant flow between inlet transition coolant duct 119a and coolant transition channels 115a such that the coolant flow and/or temperature becomes more uniform as it traverses coolant channels 114 across the entire width of the flow field plate. Note that the absolute coolant pressures over the width of the plate are not necessarily uniform. However, the pressure drops along the channels in the coolant channel region and hence the coolant flows in the coolant channel region channels are rendered more uniform. In a like manner, porous insert 200b is designed to restrict the coolant flow between coolant transition channels 115b and outlet transition coolant duct 119b such that the coolant flow and/or temperature is more uniform as it traverses coolant channels 114. To accomplish this, porous inserts 200a and 200b are made non-uniform in their resistance to coolant flow across their width. As more easily seen in the enlarged view of FIG. 2b, this is achieved here by employing porous inserts which are greater in length near coolant ports 106, 107 (i.e. length dimension X in FIG. 2b) than in the middle of coolant ducts 119a, 119b (i.e. length dimension Y in FIG. 2b).

In order to determine appropriate resistance profiles for the porous insert or inserts in a given embodiment, first the relevant coolant distribution parameters (flow, pressure drop, and/or temperature) are quantitatively determined over the coolant channels. This can be done either by calculation or empirically by various methods available to those skilled in the art. For instance, computational fluid dynamics (CFD) can be used to model the coolant flows and pressures in a given embodiment. Or, actual temperature profiles can be measured by appropriately instrumenting test stacks. With this information available, desired resistance profiles for an insert or inserts can then be determined to reduce any non-uniformity and make the coolant flow and/or temperature more uniform throughout the coolant channel regions of the fuel cells.

Resistance variations can be achieved in a desired porous insert by varying one or more insert characteristics including length (i.e. the dimension in the length direction of the plate assembly), permeability, porosity, or average pore size. Metal foams can be suitable materials for use an appropriate inserts. Their structural properties (e.g. porosity, pore size, permeability) can typically be in appropriate ranges suitable for this type of application. For instance, porosities greater than about 80% and permeabilities in the range from about 250 to 300 millidarcies are expected to be suitable. And average pore sizes less than about 200 micrometers are expected to be suitable. Estimates for resistance can be made for various metal foam properties for instance by using CFD methods and Ergun-type equations.

To prevent coolant shorting along the interface between porous inserts 200a, 200b and coolant transition channels 115a, 115b, the inserts are inserted such that they make good contact with the ends of coolant transition channels 115a, 115b. More preferably, the inserts are actually impressed into the ends of channels 115a, 115b, e.g. from about 1 to 3 mm into the channel ends. Note therefore that although a slight gap is depicted between porous inserts 200a and 200b and channels 115a, 115b in FIG. 2a, this gap has been provided solely to help visually distinguish the components. Again, no such gap is desired in an actual embodiment.

The preceding description illustrates one possible porous insert suitable for improving the coolant pressure drop and temperature distribution in one specific fuel cell design. As those skilled in the art will appreciate, other types of inserts may be employed for this fuel cell design and also other fuel cell designs may benefit from use of such inserts. For instance, materials other than metal foams may be contemplated as insert materials, and other properties may be varied to obtain the desired non-uniformity in resistance to coolant flow.

While the use of inserts may be considered for other fuel cell designs and all types of plates, it can be particularly suitable for use in designs employing metallic plates where there is less opportunity to form desirable features directly into the plate material itself.

Porous inserts of the invention may also be used in combination with other features that serve to improve the flow or temperature distribution of coolant. For instance, certain other features may be incorporated in the inlet transition region to mix and make the distribution more uniform.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A bipolar plate assembly having an internal coolant flow field for a fuel cell comprising:
   an anode plate comprising:
      inlet and outlet ports for each of fuel, oxidant, and coolant fluids;
      a fuel flow field comprising an active region on the anode side of the anode plate wherein the active region comprises a plurality of fuel channels whose inlets and outlets are fluidly connected to the inlet and outlet fuel ports respectively; and
      a coolant flow field comprising a coolant channel region, an inlet transition region, and an outlet transition region on the coolant side of the anode plate, wherein the inlet and outlet transition regions each comprise at least one transition coolant duct, the coolant channel region comprises a plurality of coolant channels whose inlets and outlets are fluidly connected to the inlet and outlet transition coolant ducts in the inlet and outlet transition regions respectively, and the inlet and outlet coolant ducts are fluidly connected to the inlet and outlet coolant ports respectively;
   wherein the length direction of the plate assembly is defined by the length direction of the coolant channels and the width direction of the plate assembly is perpendicular to the length direction of the plate assembly in the plane of the plate;
   a cathode plate comprising:
      inlet and outlet ports for each of fuel, oxidant, and coolant fluids;
      an oxidant flow field comprising an active region on the cathode side of the cathode plate wherein the active region comprises a plurality of oxidant channels whose inlets and outlets are fluidly connected to the inlet and outlet oxidant ports respectively; and
      a coolant flow field comprising a coolant channel region, an inlet transition region, and an outlet transition region on the coolant side of the anode plate, wherein the inlet and outlet transition regions each comprise at least one transition coolant duct, the coolant channel region comprises a plurality of coolant channels whose inlets and outlets are fluidly connected to the inlet and outlet transition coolant ducts in the inlet and outlet transition regions respectively, and the inlet and outlet coolant ducts are fluidly connected to the inlet and outlet coolant ports respectively;
   wherein the coolant side of the anode plate is bonded to the coolant side of the cathode plate to form the internal coolant flow field;
   wherein the plate assembly comprises a porous insert in at least one of the inlet and outlet transition coolant ducts;
   wherein the porous insert is non-uniform over the width of the plate assembly;
   wherein the porous insert is characterized by length and width dimensions in the length and width directions of the plate assembly respectively; and
   wherein the length of the porous insert varies over the width of the porous insert.

2. The plate assembly of claim 1 wherein the porous insert is in the inlet transition coolant duct.

3. The plate assembly of claim 2 comprising an additional porous insert in the outlet transition coolant duct.

4. The plate assembly of claim 1 wherein the porous insert is made of metal foam.

5. The plate assembly of claim 1 wherein the inlet coolant port is not aligned with the coolant channels in the coolant channel region.

6. The plate assembly of claim 1 wherein the length of the porous insert is smaller near the middle than at the ends over the width of the porous insert.

7. The plate assembly of claim 6 wherein the length of the porous insert near the middle is about half of the length near the ends over the width of the porous insert.

8. The plate assembly of claim 1 wherein the permeability of the porous insert is in the range from about 250 to 300 millidarcies.

9. A bipolar plate assembly having an internal coolant flow field for a fuel cell comprising:
an anode plate comprising:
inlet and outlet ports for each of fuel, oxidant, and coolant fluids;
a fuel flow field comprising an active region on the anode side of the anode plate wherein the active region comprises a plurality of fuel channels whose inlets and outlets are fluidly connected to the inlet and outlet fuel ports respectively; and
a coolant flow field comprising a coolant channel region, an inlet transition region, and an outlet transition region on the coolant side of the anode plate, wherein the inlet and outlet transition regions each comprise at least one transition coolant duct, the coolant channel region comprises a plurality of coolant channels whose inlets and outlets are fluidly connected to the inlet and outlet transition coolant ducts in the inlet and outlet transition regions respectively, and the inlet and outlet coolant ducts are fluidly connected to the inlet and outlet coolant ports respectively;
wherein the length direction of the plate assembly is defined by the length direction of the coolant channels and the width direction of the plate assembly is perpendicular to the length direction of the plate assembly in the plane of the plate;
a cathode plate comprising:
inlet and outlet ports for each of fuel, oxidant, and coolant fluids;
an oxidant flow field comprising an active region on the cathode side of the cathode plate wherein the active region comprises a plurality of oxidant channels whose inlets and outlets are fluidly connected to the inlet and outlet oxidant ports respectively; and
a coolant flow field comprising a coolant channel region, an inlet transition region, and an outlet transition region on the coolant side of the anode plate, wherein the inlet and outlet transition regions each comprise at least one transition coolant duct, the coolant channel region comprises a plurality of coolant channels whose inlets and outlets are fluidly connected to the inlet and outlet transition coolant ducts in the inlet and outlet transition regions respectively, and the inlet and outlet coolant ducts are fluidly connected to the inlet and outlet coolant ports respectively;
wherein the coolant side of the anode plate is bonded to the coolant side of the cathode plate to form the internal coolant flow field;
wherein the plate assembly comprises a porous insert in at least one of the inlet and outlet transition coolant ducts;
wherein the porous insert is non-uniform over the width of the plate assembly; and
wherein the average pore size of the porous insert is less than about 200 micrometers.

10. The plate assembly of claim 1 wherein the plurality of coolant channels are essentially parallel and straight.

11. A bipolar plate assembly having an internal coolant flow field for a fuel cell comprising:
an anode plate comprising:
inlet and outlet ports for each of fuel, oxidant, and coolant fluids;
a fuel flow field comprising an active region on the anode side of the anode plate wherein the active region comprises a plurality of fuel channels whose inlets and outlets are fluidly connected to the inlet and outlet fuel ports respectively; and
a coolant flow field comprising a coolant channel region, an inlet transition region, and an outlet transition region on the coolant side of the anode plate, wherein the inlet and outlet transition regions each comprise at least one transition coolant duct, the coolant channel region comprises a plurality of coolant channels whose inlets and outlets are fluidly connected to the inlet and outlet transition coolant ducts in the inlet and outlet transition regions respectively, and the inlet and outlet coolant ducts are fluidly connected to the inlet and outlet coolant ports respectively;
wherein the length direction of the plate assembly is defined by the length direction of the coolant channels and the width direction of the plate assembly is perpendicular to the length direction of the plate assembly in the plane of the plate;
a cathode plate comprising:
inlet and outlet ports for each of fuel, oxidant, and coolant fluids;
an oxidant flow field comprising an active region on the cathode side of the cathode plate wherein the active region comprises a plurality of oxidant channels whose inlets and outlets are fluidly connected to the inlet and outlet oxidant ports respectively; and
a coolant flow field comprising a coolant channel region, an inlet transition region, and an outlet transition region on the coolant side of the anode plate, wherein the inlet and outlet transition regions each comprise at least one transition coolant duct, the coolant channel region comprises a plurality of coolant channels whose inlets and outlets are fluidly connected to the inlet and outlet transition coolant ducts in the inlet and outlet transition regions respectively, and the inlet and outlet coolant ducts are fluidly connected to the inlet and outlet coolant ports respectively;
wherein the coolant side of the anode plate is bonded to the coolant side of the cathode plate to form the internal coolant flow field;
wherein the plate assembly comprises a porous insert in at least one of the inlet and outlet transition coolant ducts;
wherein the porous insert is non-uniform over the width of the plate assembly;
wherein the porous insert is in contact with the ends of the plurality of coolant channels; and
wherein the porous insert is impressed from about 1 to 3 mm into the ends of the plurality of coolant channels.

12. A fuel cell stack comprising a series stack of solid polymer electrolyte fuel cells and a plurality of the bipolar plate assemblies of claim 1.

13. The plate assembly of claim 9 wherein the porous insert is in the inlet transition coolant duct.

14. The plate assembly of claim 13 comprising an additional porous insert in the outlet transition coolant duct.

15. The plate assembly of claim 9 wherein the porous insert is made of metal foam.

16. The plate assembly of claim 9 wherein the inlet coolant port is not aligned with the coolant channels in the coolant channel region.

17. The plate assembly of claim 11 wherein the porous insert is in the inlet transition coolant duct.

18. The plate assembly of claim 17 comprising an additional porous insert in the outlet transition coolant duct.

19. The plate assembly of claim 11 wherein the porous insert is made of metal foam.

20. The plate assembly of claim 11 wherein the inlet coolant port is not aligned with the coolant channels in the coolant channel region.

* * * * *